United States Patent [19]

Evans et al.

[11] 4,426,663
[45] Jan. 17, 1984

[54] REAL-TIME OPTICAL FILTERING METHOD WITH IMPROVED FILTERED IMAGE DETECTION AND BANDWIDTH ADJUSTMENT

[75] Inventors: David W. Evans, Beavercreek; Arthur P. Ginsburg, Dayton, both of Ohio

[73] Assignee: The United States of America as represented by the Secretary of the Air Force, Washington, D.C.

[21] Appl. No.: 337,348

[22] Filed: Jan. 6, 1982

[51] Int. Cl.³ .................. H04N 5/74; H04N 9/31; G01B 9/02

[52] U.S. Cl. ...................... 358/211; 358/63; 358/231; 350/162.12; 356/352

[58] Field of Search ............ 358/211, 225, 226, 42, 358/60, 61, 62, 63, 231, 232, 236; 350/103, 162 SF, 173, 174, 162.12, 162.15, 162.19; 356/345, 352, 354; 353/20

[56] References Cited

U.S. PATENT DOCUMENTS

| | | | |
|---|---|---|---|
| 3,333,460 | 5/1968 | Pritchard | 358/61 |
| 3,459,467 | 8/1969 | Kantor | 350/163 |
| 3,623,024 | 11/1971 | Hamilton | 350/162.12 |
| 3,729,634 | 4/1973 | Jensen | 350/162.12 |
| 3,915,573 | 10/1975 | Knoll et al. | 356/112 |
| 3,992,682 | 11/1976 | White | 358/211 |
| 4,150,396 | 4/1979 | Hareng | 358/60 |
| 4,152,674 | 5/1979 | Taguchi | 331/94.5 |
| 4,173,442 | 11/1979 | Snyder | 356/352 |
| 4,195,931 | 4/1980 | Hara | 356/352 |
| 4,196,396 | 4/1980 | Smith | 356/352 |
| 4,213,146 | 7/1980 | Maiman | 358/63 |

OTHER PUBLICATIONS

Specifying Relevant Spatial Information for Image Evaluation and Display Design: An Explanation of How We See Certain Objects, by Arthur P. Ginsburg, Proceedings of the SID, vol. 21/3, 1980, pp. 219–227.

Visual Information Processing Based on Spatial Filters Constrained by Biological Data, by Arthur P. Ginsburg, AMRL-TR-78-129, vols. I and II, Dec. 1978, pp. 1 to 306.

Indebetouw, G., "Tunable Spatial Filtering with a Fabry-Perot Etalon," *Applied Optics*, Mar. 1, 1980, vol. 19, No. 5, pp. 761-764.

*Primary Examiner*—Tommy P. Chin
*Attorney, Agent, or Firm*—Donald J. Singer; John R. Flanagan

[57] ABSTRACT

In a system for real-time coherent optical filtering of visual imagery which encompasses a laser and a set of lenses for transmitting a visual target image of an input, a Fabry-Perot interferometer for filtering the target image to produce a filtered target image at an output having a predetermined bandwidth of spatial frequency information, the improvements relate to the output being in the form of a low-light level video system capable of detecting the filtered image even when at a low level of luminance, and a laser adjustable in operating power between low and high levels and in operating wavelength within a wide range for adjusting the bandwidths of the interferometer between narrow and broad ranges.

3 Claims, 7 Drawing Figures

REAL-TIME OPTICAL FILTERING METHOD WITH IMPROVED FILTERED IMAGE DETECTION AND BANDWIDTH ADJUSTMENT

RIGHTS OF THE GOVERNMENT

The invention described herein may be manufactured and used by or for the Government of the United States for all governmental purposes without the payment of any royalty.

CROSS REFERENCES TO RELATED APPLICATIONS

Reference is hereby made to the following co-pending U.S. applications dealing with related subject matter and assigned to the assignee of the present invention:

1. "Real-Time Optical Filtering System with Spatial and Temporal Enhancement of Visual Information" by David W. Evans, U.S. Ser. No. 337,349, filed Jan. 6, 1982.

2. "Varying Bandpass of Optical Spatial Filter by Rotating Mirrors having Changing Reflectivity" by David W. Evans, U.S. Ser. No. 337,350, filed Jan. 6, 1982.

BACKGROUND OF THE INVENTION

1. Field of the Invention

The present invention broadly relates to real-time coherent optical filtering of imagery and, more particularly, is concerned with a method of spatial filtering which permits improved filtered image detection and spatial frequency bandwidth adjustment.

2. Description of the Prior Art

Recent psychophysical studies clearly indicate the presence of spatial frequency selective filters or channels within the visual system. Evidence from research suggests that these channels are quasi-independent, each varying from about one-to-two octaves in bandwidth.

More recently, studies show that the different spatial frequency channels are used to perform different visual tasks: low and mid frequencies are used for form perception and recognition while high frequencies are used for perception of fine detail. For example, Ginsburg (see "Specifying Relevant Spatial Information for Image Evaluation and Display Design: An Explanation of How We See Certain Objects," *Proceedings of SID*, 1980, vol. 21/3) demonstrated that a channel two octaves wide centered at 16 cpo (cycles per object) can be used to transmit all the information needed to recognize a human face.

The implication of these results is that the visual system is made up of many filters, each being responsible for capturing the spatial information needed to perform a particular visual task. If this view is correct then visual filtering processes for a particular task can be modelled by a spatial filtering system with similar characteristics.

However, until recently, real-time coherent optical filtering of imagery was accomplished solely by placing a spatial frequency mask in the Fourier transform plane of a coherent optical data processing system. The transfer function of the system was determined by the amplitude transmittance of the mask. Changing transfer functions required replacement and adjustment of numerous masks in the Fourier plane, a time-consuming problem. Such a system is inflexible if more than one special type of filtering is required.

Now, Indebetouw (see "Turnable Spatial Filtering with a Fabry-Perot Etalon," *Applied Optics*, Mar. 1, 1981, vol. 19, No. 5, pp. 761-764) has shown that flexible bandpass capability could be achieved by placing an angular filter in the image plane of the system. An angular filter is a device that is capable of selecting a set of plane waves with arbitrarily chosen direction cosines. Since direction cosines are proportional to the input spatial frequencies, the angular spectrum is a scaled version of the Fourier transform. Thus, the angular filter can select spatial frequency bands similar to a mask in the Fourier plane.

Indebetouw uses a Fabry-Perot etalon or interferometer as his angular filter. The center frequency and bandwidth of the filter can be easily chosen by varying the finesse (number of internal reflections within the mirror pair) and spacing of the mirror pair. The center frequency of the bandpass filter can be adjusted by small (less than 0.05 mm) changes in the mirror spacing of the interferometer, while the bandwidth of the filter can be adjusted by larger (greater than 0.25 mm) changes in the mirror spacing. The farther apart the overall spacing of the mirrors, the narrower the bandwidth.

While the Indebetouw system is a definite step forward in the field of real-time coherent optical filtering of imagery, certain improvements are needed in order to enhance its capabilities as a research tool for studying visual processes and as a laboratory tool for analysis of pictorial images. As mentioned above at the beginning, a model of visual processing has been developed which views the visual system as a filtering system. As such, it has been shown that certain bandwidths of spatial frequency information in images are used primarily by the visual system for detection and identification of targets. If these bandwidths can be properly enhanced with real-time spatial filtering, then the provision of an optical processing system with filtering characteristics more closely modelling human vision may be possible.

SUMMARY OF THE INVENTION

The system of real-time coherent optical filtering of visual imagery, as disclosed herein, has several improved features which are designed to satisfy the aforementioned need for a system capable of more closely modelling human vision. While some of the features comprise the inventions claimed in the co-pending applications, cross-referenced above, all of the features are illustrated and described herein for facilitating a complete and thorough understanding of those of the features of system comprising the present invention.

The present invention is directed to features which permit improved filtered image detection and spatial frequency bandwidth adjustment. More particularly, the improvement concerns the use of a low-light level video system for enhancing and recording a low luminance image of the filtered output. The video system allows the laser, which coherently illuminates the visual image, to be operated between a wider range of spectral wavelengths and low and high predetermined power levels. As a result, adjustment of the bandwidth of the filtering means in the form of a Fabry-Perot interferometer may be more easily made by merely varying the power level and wavelength output of the laser.

Accordingly, the present invention provides improvement in a method of real-time coherent optical filtering of visual imagery. The filtering method includes transmitting a visual target image of an input, the steps of filtering the transmitted target image to produce a filtered target image having a variable bandwidth of spatial frequency information, and projecting the filtered target image.

The improvement relates to the step of receiving the projected filtered target image and being capable of detecting the image even when at a low level of luminance. Further, the improvement relates to the step of coherently illuminating the visual target image of the input prior to transmitting the same, and adjusting the bandwidth of the filtering between narrow and broad ranges thereof, so as to vary the bandwidth of the spatial frequency information, by varying the power at which the illuminating is carried out between low and high predetermined levels and by varying the wavelength at which the illuminating is carried out within a predetermined range. This improvement obviates the complicated task of having to adjust the mirror spacing in the filtering means, when it takes the form of a Fabry-Perot interferometer, in order to vary the spatial frequency bandwidth.

DETAILED DESCRIPTION OF THE INVENTION

COHERENT OPTICAL FILTERING SYSTEM—IN GENERAL

Figure 1:
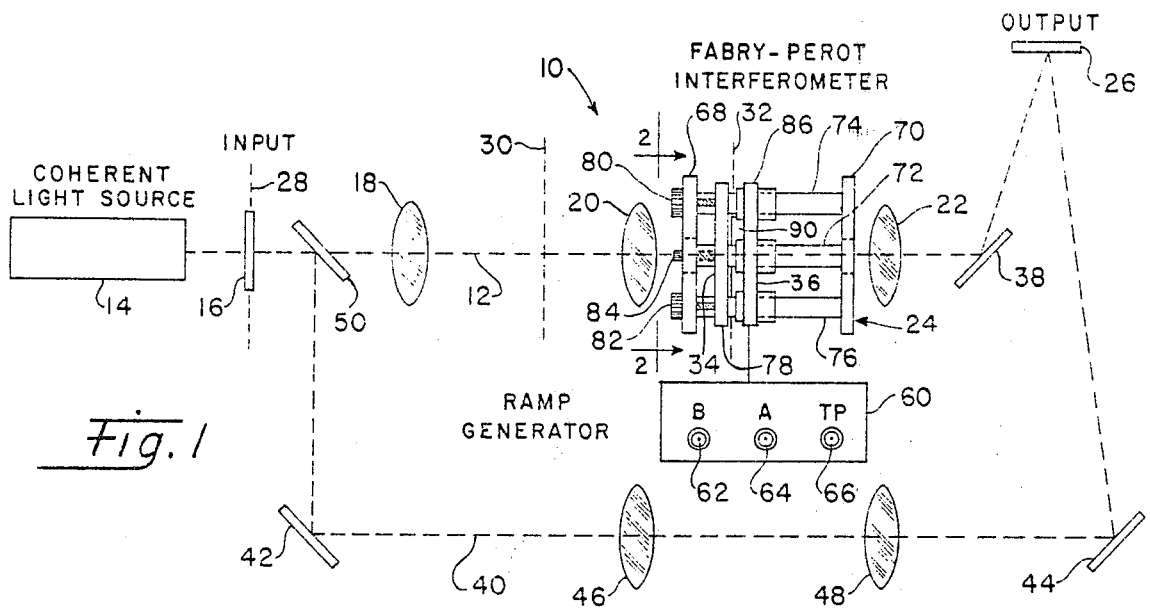
FIG. 1 is a plan view in schematic form of an improved real-time coherent optical filtering system.

Referring now to the drawings, and more particularly to FIG. 1, there is shown in schematic form an improved real-time coherent optical filtering system, being generally designated 10. The portion of the system 10, which was previously disclosed by Indebetouw in the cited *Applied Optics* article, encompasses some of the components disposed along a first optical axis 12, namely, the coherent light source or laser 14, an input 16, the three lenses 18, 20, 22, the spatial filter in the form of a Fabry-Perot interferometer 24, and the output 26.

The first optical axis 12 of the system 10 defines a filtered light path from the input 16 to the output 26. The input 16 is a desired target object, such as some predetermined image recorded on a transparency, located at an object plane 28 and illuminated by coherent light from laser 14.

The lens 18 constitutes a first transform lens which causes the light illuminating the object plane 28 to converge at the rear focal plane 30 of the lens 18. The rear focal plane 30 constitutes a first transform plane over which the light is distributed in the form of a Fraunhofer diffraction pattern to produce a two-dimensional Fourier transform of the object image. In other words, the spatial frequency spectrum of the object image is spread across the rear focal or transform plane 30.

The lens 20 constitutes a first imaging lens which retransform the diffraction pattern at the transform plane 30, which is also the front focal plane of the imaging lens 20, into an image of the target object at an intermediate image plane 32 by projecting the light toward the next lens 22 along the first optical axis 12. The intermediate image plane 32 is located at the rear focal plane of lens 20 and the front focal plane of lens 22.

The Fabry-Perot interferometer 24, which may take the form of Model RC-110 manufactured by Burleigh Instruments, is located at the intermediate image plane 32 and functions as a spatial filter which filters the light projected by lens 20 to lens 22. The bandwidth and center frequency of the Fabry-Perot interferometer or spatial filter 24 can be chosen by varying the finesse (number of internal reflections between a pair of mirrors 34, 36) and the spacing of the mirrors. The third lens 22 projects the spatially filtered image from the filter 24 to the output 26 via a mirror 38.

IMPROVEMENTS FOR SPATIAL AND TEMPORAL ENHANCEMENT OF VISUAL INFORMATION

The invention of the first cross-referenced application is directed to improvement of the above-described conventional portion of the system 10 for producing both spatial and temporal enhancement of the predetermined bandwidth of spatial frequency information composing the filtered image. Such enhancement of the visual target object image improves real-time detection and identification of a target by an observer.

Spatial enhancement is achieved by overlaying the filtered image, having the predetermined spatial frequency bandwidth, by the original image of the target object. The improvement which provides such spatial enhancement encompasses the components disposed along a second optical axis 40, namely mirrors 42, 44 and lenses 46, 48, and a beam splitter 50 which reflects some of the coherent light from the laser 14, after passage through the input object 16, to the first mirror 42. The lenses 46, 48 together perform the identical functions of the transform and imaging lenses 18, 20 as described previously. However, the image transmitted along the second optical axis 40 remains unfiltered since there is no spatial filter present. Consequently, the second optical axis 40 of the system 10 defines an unfiltered light path from the input 16 to the output 26, which is substantially parallel to the first optical axis 12 or filtered light path.

At the output 26, the filtered and unfiltered images may be displayed separately for comparison purposes or overlaid one on the other. In the case of the latter, the spatial frequency bandwidth of interest in the original unfiltered image will have a higher contrast than the other spatial frequency information therein.

Figure 7:
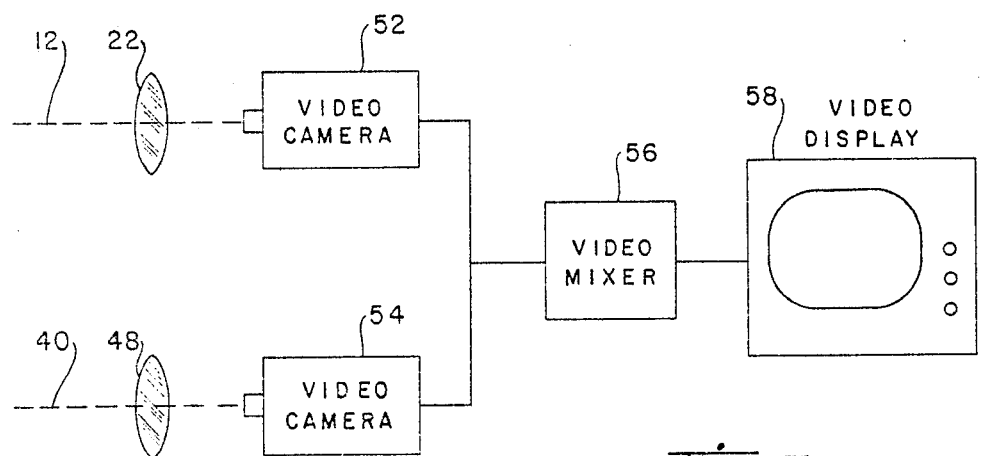
FIG. 7 is a plan view in schematic form of an alternative form of an output for the system of FIG. 1.

The output 26 may take the alternative form shown in FIG. 7 wherein video cameras 52 and 54 are provided in the respective filtered and unfiltered light paths 12, 40 for receiving the respective images therein. A video mixer 56 connected to each of the cameras 52, 54 overlays the images, and a video display 58 connected to the mixer 56 is used to display the overlaid images.

Temporal enhancement is achieved by flickering the filtered image, that is, the visual information in the spatial frequency bandwidth of interest. Temporal enhancement—image flickering—together with spatial enhancement can be used by the observer as a cueing mechanism for image pattern recognition. The improvement which provides such temporal enhancement is embodied in the mode of operation of a ramp generator 60, which may take the form of Model RC-42 manufactured by Burleigh Instruments, for controlling the Fabry-Perot interferometer 24 used in the first optical path 12 for filtering the desired bandwidth of spatial frequency information. The ramp generator 60 is used to sweep through the range of spatial frequency information in the image believed to be important for image detection and identification. While it is known per se to use a ramp generator connected to a piezoelectric transducer drive in the interferometer 24 to vary the spacing of the mirrors 34, 36 therein, the improvement herein relates to controlling the signal bias (to set the center frequency), the amplitude (to set the bandwidth), and the time period (to set the sweep rate) by knobs 62, 64, 66 of the ramp generator 60 so as to sweep through a desired channel, such as one centered at 16 cpo with an approximately 2 octave bandwidth, at a desired sweep rate, such as 5 Hz, and cause the filtered image to flicker. The region of spatial information used for recognition will then appear to flicker and the flickering will provide temporal enhancement for the specified range of information. Consequently, a photo-detector need not be used to measure the energy output as proposed in the Indebetouw article, since now the flickering filtered image can be detected by the human eye.

To summarize, the uniqueness of this improvement is that the observer can flicker any range of spatial frequency information simply by adjusting the bias, amplitude, and time period of the ramp signal. Since the improved system 10 can now be adjusted to approximate the known filtering processes of the human visual system, the range of information in a target object most important for visual detection and recognition can be specifically enhanced. Additionally, the provision of the parallel, unfiltered light path 40 provides spatial enhancement for identification of target objects.

Furthermore, determining which channel of spatial information can best be used to enhance identification and detection performance is made easier by a flexible bandpass real-time system of this type, because many filter functions can be tested within a short time period. Ultimately, this type of system could be used to model the total visual filter functions. Ginsburg (in "Visual Information Processing Based on Spatial Filters Constrained by Biological Data," Ph.D. Dissertation, 1977, University of Cambridge) has previously shown that the visual filter function can be viewed as a hierachy of filtered images, each tuned to a separate range of spatial frequencies. A bank of angular spatial filters, each tuned to a specific range of spatial information, similar to that of a visual channel, could provide this hierachy of filtered images. An experimenter could then manipulate the various channels to achieve the desired output image.

IMPROVED SPATIAL FILTER WITH ROTATABLE MIRRORS HAVING CHANGING REFLECTIVITY

Figure 2:
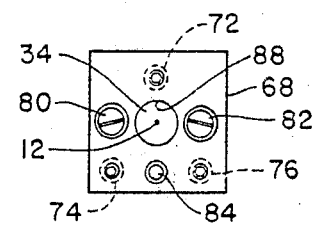
FIG. 2 is an end view of the Fabry-Perot interferometer as seen along line 2—2 of FIG. 1.

It was mentioned earlier in the background section that Indebetouw first suggested the use of a Fabry-Perot etalon or interferometer as an angular spatial filter at the intermediate image plane of the system. The interferometer 24, as seen in FIG. 1, includes front and rear end plates 68, 70 interconnected by upper rod 72 and lower rods 74, 76 which are disposed in a generally equilateral triangular arrangement, as seen in FIG. 2. The front or fixed mirror 34 is mounted in a front holder 78 the vertical alignment of which can be changed by use of adjustment screws 80, 82 and 84, mounted in the front end plate 68, for establishing parallelism with the rear or movable mirror 36. The mirror 36 is mounted by a rear spider 86 which is slidable longitudinally along the three rods 72, 74, 76 to adjust the spacing between the mirrors 34, 36. As seen in FIG. 2, there is a central opening 88 defined through the front end plate 68, and an identical opening (not shown) through the rear plate 70, both being aligned with the mirrors 34, 36, for allowing transmission of light through the interferometer 24. The rear mirror 36 has a piezoelectric transducer 90 attached thereto for varying the mirror spacing for scanning when a voltage having a sawtooth waveform is applied thereto by the ramp generator 60.

The invention of the second cross-referenced application is directed to improvement of the Fabry-Perot interferometer to permit easier adjustment of the spatial frequency bandwidth thereof when used as a flexible bandpass spatial filter. The improvement eliminates the necessity of reestablishing a condition of parallelism between the mirrors 34, 36 after each time the mirror 36 is slidably moved longitudinally toward or away from the mirror 34 in changing the spacing between the mirrors.

Figure 3:
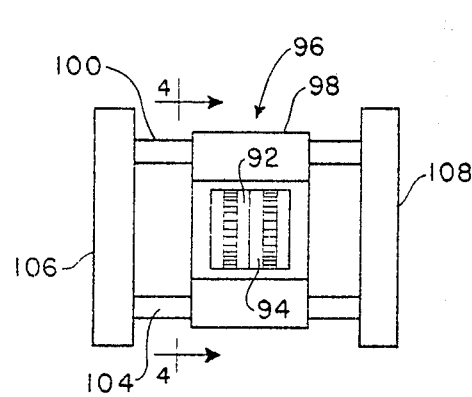
FIG. 3 is a side view of an improved Fabry-Perot interferometer, as seen along line 3—3 of FIG. 4, wherein the bandwidth of the device may be changed by rotating its mirror.
Figure 4:
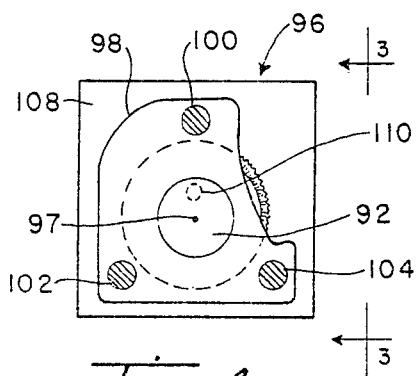
FIG. 4 is a view in partial section taken along line 4—4 of FIG. 3.

Specifically, as shown in FIGS. 3 and 4, the mirrors 92, 94 of the improved interferometer 96 are rotatably mounted about a common axis 97 within a casing 98 which is mounted on rods 100, 102, 104 interconnecting end plates 106, 108. The rods and end plates are identical to those of the interferometer 24. The mirrors are maintained in spaced apart parallel relationship within the casing 98.

Figure 5:
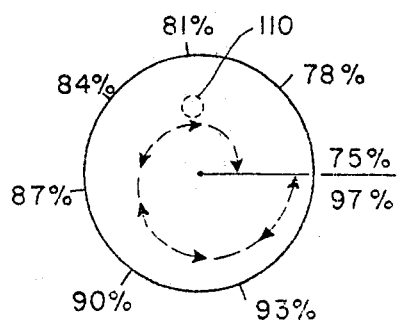
FIG. 5 is a diagrammatic representation of the variability in the reflectivity of the mirrors of the improved interferometer of FIG. 3.

As diagrammatically depicted in FIG. 5 the reflectivity value of the mirrors continuously varies about the axis 97 from one angular sector of the mirror to the next. Therefore, the bandwidth of spatial frequency information in an image, projected onto a common region 110 of each mirror offset from the axis 97 and filtered by the mirrors 92, 94, may be varied by rotating the mirrors about the axis 97. Thus, reflectivity of the mirrors changes as a function of axial rotation thereof. As mentioned above, such rotational mounting of the mirrors 92, 94 is fixed relative to the spacing between the mirrors such that rotation of the mirrors does not effect their generally parallel relationship.

By changing the reflectivity of the interferometer mirrors, the finesse can be changed and thus the bandwidth. Finesse is directly proportional to the bandwidth, as readily apparent from the functional relationships defined below:

$$F = \frac{\pi R}{(1 - R)}$$

$$\Delta p = (F/2) \left( \frac{p_{max}^2}{p} \right)$$

where F is finesse; R is reflectivity; p is spatial frequency and $\Delta p$ is bandwidth. Therefore, the bandwidth changes as finesse is changed due to the change in reflectivity. Consequently, the bandwidth can be easily manipulated by rotation of the mirrors. Rotation may be carried out manually or by using some suitable mechanical means. As seen in FIG. 5, a reflectivity variation of from 75% to 97% may be used. This would allow a change of the bandwidth from 2.5 octaves to 1.0 octave.

IMPROVEMENTS FOR IMPROVED FILTERED IMAGE DETECTION AND BANDWIDTH ADJUSTMENT

Figure 6:
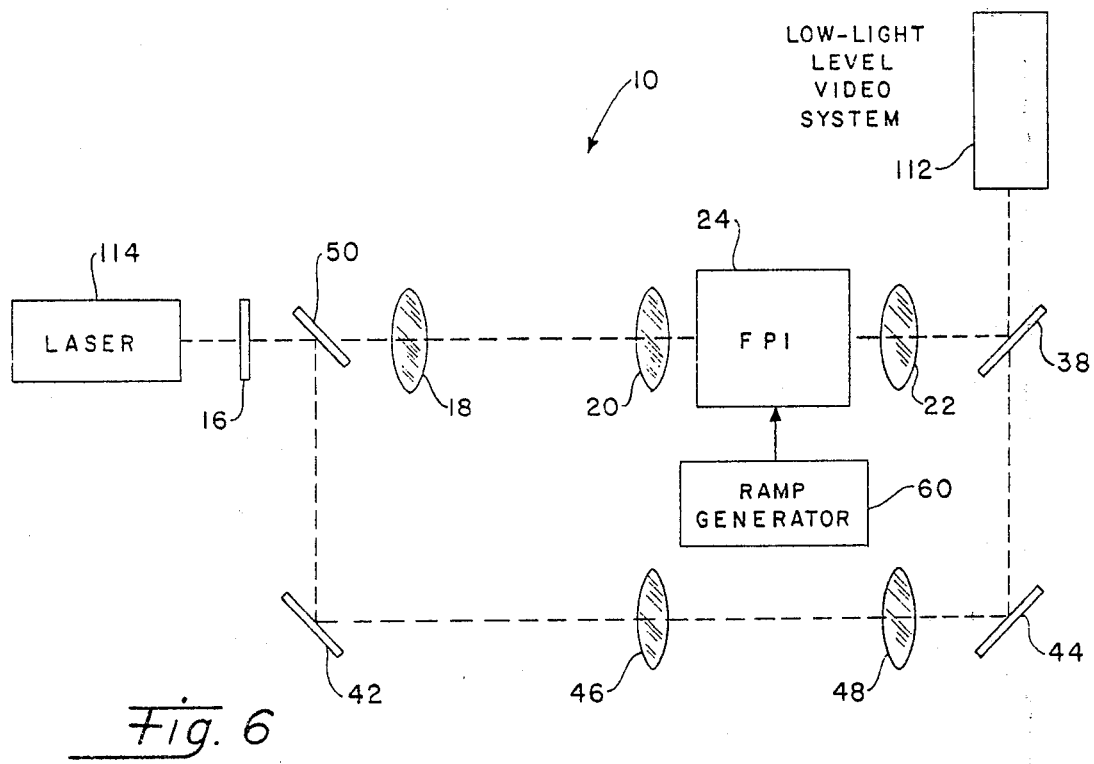
FIG. 6 is a plan view in schematic form of the real-time coherent optical filtering system incorporating the improvements provided by the present invention.

Turning now to FIG. 6, there is shown improvements provided to the system 10 by the present invention for enhancing and recording a low luminance filtered output image. This capability is provided by the use of a low-light level video system 112 at the output. The video system 112, in turn, allows the laser 114, which may take the form of Model 162A manufactured by Spectra Physics and which coherently illuminates the visual image, to be operated between a wider range of spectral wavelengths and low and high predetermined power levels. As a result, adjustment of the bandwidth of the filtering means in the form of the Fabry-Perot interferometer 24 may be more easily made by merely varying the power level and wavelength output of the laser. Variation of the power and wavelength is carried out simultaneously by manipulating the vertical adjustment knob for the rear mirror in the laser. For example, the bandwidth may be varied between one octave to low pass by varying the power level of the laser between 1 to 12 milliwatts and varying the wavelength by up to 70 nanometers, between 450 and 520 nanometers.

The advantage of using the low-light level camera is that it lets one operate in a region of wavelength passbands and power outputs that before were too low in luminance to be usable with the human eye. Now, an observer can sweep through wider ranges of wavelengths and power levels, change the bandwidth, and still be able to see the output with unaided vision.

It is thought that the improvement provided by the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In a method of real-time coherent optical filtering of visual imagery including the steps of transmitting a visual target image of an input, filtering said transmitted target image to produce a filtered target image having a variable bandwidth of spatial frequency information, and projecting said filtered target image, the improvement which comprises the steps of:
    (a) receiving said projected filtered target image and detecting said image even when at a low level of luminance; and
    (b) coherently illuminating said visual target image of said input prior to said transmitting of the same, and adjusting said bandwidth of said filtering between narrow and broad ranges thereof, so as to vary the bandwidth of said spatial information, by varying the power at which said illuminating is carried out between low and high predetermined levels and by varying the wavelength at which said illuminating is carried out within a predetermined range.

2. The real-time coherent optical filtering method of claim 1, wherein a low-light level video system is used for receiving and detecting said image.

3. The real-time coherent optical filtering method of claim 1, wherein a laser adjustable in operating power between low and high levels and in operating wavelength within a predetermined wider range is used for coherently illuminating said visual target image and adjusting said bandwidth of said filtering.

* * * * *